J. J. WASKOM.
DRIVING MEANS FOR CHILDREN'S VEHICLES.
APPLICATION FILED MAR. 13, 1911.
1,032,455.
Patented July 16, 1912.
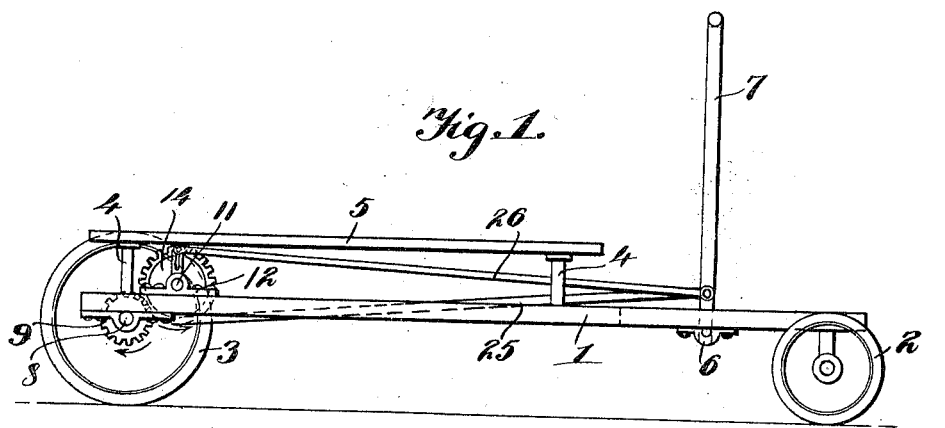
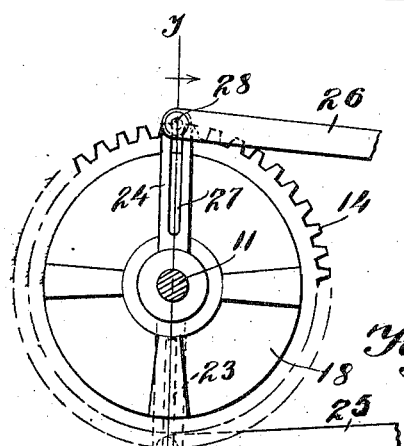
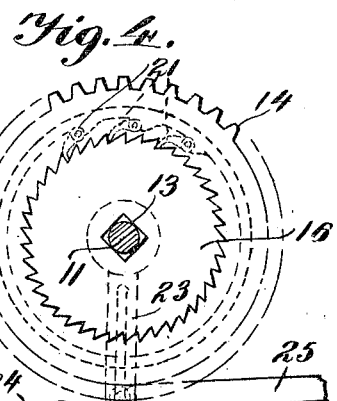
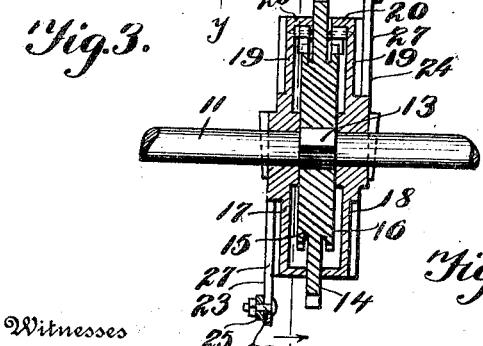
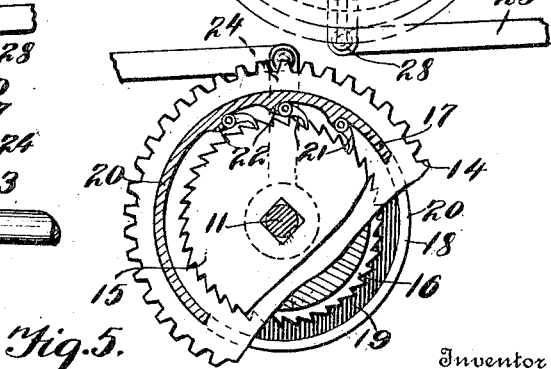
Witnesses
William C Linton
J. S. Austin
Inventor
Jacob J. Waskom.
By Joshua R. H. Potts,
Attorney

UNITED STATES PATENT OFFICE.

JACOB J. WASKOM, OF DANVILLE, KENTUCKY.

DRIVING MEANS FOR CHILDREN'S VEHICLES.

1,032,455.　　　Specification of Letters Patent.　　Patented July 16, 1912.

Application filed March 13, 1911. Serial No. 613,995.

*To all whom it may concern:*

Be it known that I, JACOB J. WASKOM, a citizen of the United States, residing at Danville, county of Boyle, and State of Kentucky, have invented certain new and useful Improvements in Driving Means for Children's Vehicles, of which the following is a specification.

My invention relates to speeders, that is, to children's vehicles which are driven by a reciprocating arm or lever operated by the child riding the vehicle.

More particularly my invention relates to means for driving vehicles of the class mentioned.

The object of my invention is to provide a device of the class mentioned which shall be positively driven forwardly with each stroke of the lever, both forward and backward, and irrespective of the initial position of the lever.

A further object of my invention is to provide a device of the class mentioned in which the operating mechanism shall have no dead center.

A further object of my invention is to provide a device of the class under consideration which may be readily adjusted to regulate the amount of power necessary to apply to the lever for driving the device in order to suit the same to the strength of the child.

Other objects will appear hereinafter.

With these objects in view my invention consists generally in a vehicle of the class under consideration having a driving axle and an operating lever pivotally mounted on the vehicle, a pinion on the axle, a gear mounted on a shaft and meshing with said pinion, ratchet wheels fixed to the opposite sides of said gear, casings mounted to oscillate on said shaft and inclosing the respective ratchet wheels, pawls carried by said casings and engaging said ratchet wheels, oppositely extending radial arms on said casings and pitmen connecting said lever and said arms, whereby said casings are oscillated by means of said lever and said gear driven in one direction only.

My invention further consists in a device characterized as above mentioned provided with an adjustable connection between the pitmen and the arms on the casings whereby the points of connection may be adjusted toward or from the center of rotation of the casings to the end that the power necessary for driving the device may be regulated to suit the strength of the child.

My invention further consists in various details of construction and arrangements of parts all as will be fully described hereinafter and particularly pointed out in the claim.

My invention will be more readily understood by reference to the accompanying drawings forming a part of this specification and in which—

Figure 1 is a side elevation of a speeder equipped with a driving mechanism embodying my invention in its preferred form, Fig. 2 is a side elevation of the gear and casings illustrating the same upon an enlarged scale, Fig. 3 is a section on the line *y—y* of Fig. 2, Fig. 4 is a view similar to Fig. 2 with the right hand casing removed and Fig. 5 is a section taken on substantially the line *x—x* of Fig. 3 and illustrating portions of the device broken away.

Referring now to the drawings 1 indicates the frame of the device, 2 the front or steering wheels and 3 the rear or driving wheels. Mounted above the frame 1 upon standards or brackets 4 is the usual seat 5, and pivotally mounted in front of the seat upon brackets 6 is the operating lever 7. These portions of the device are of the usual form and detail description of the same is unnecessary.

The drive wheels 3 are fixed to a rotary axle 8 mounted in bearings 9 fixed to the frame 1 and fixed to the axle 8 is a pinion 10.

11 indicates a shaft mounted in brackets or bearings 12 and extending transversely of the vehicle parallel with the axle 8. The shaft 11 is provided with a squared portion 13 upon which is mounted a gear 14 meshing with the pinion 10. Formed upon or fixed to each side of the gear 14 are ratchet wheels 15 and 16 which are of considerably less diameter than said gear. The ratchets 15 and 16 are inclosed by casings 17 and 18 respectively which are mounted to oscillate on the shaft 11 and each of which comprises a disk 19 and an inturned peripheral flange 20, the edge of which flange rests against the faces of the gear wheel 14. Pivotally mounted in the upper portion of each of the casings are a plurality of pawls 21 which engage the teeth of the respective ratchets.

The flanges 20 are formed with bosses 22 shaped to fit snugly the pivot end of the pawls, forming thrust members to support them throughout their width.

The casing 17 and 18 are provided with radially extending arms 23 and 24 respectively, the former extending downwardly and the latter upwardly, and these are connected by pitmen 25 and 26 with the lever 7. It is obvious that by oscillating the lever 7 the casings 17 and 18 will be oscillated in opposite directions. A constant positive drive is thus transmitted to the gear 14 and through the pinion 10 to the axle 8 and drive wheels 3. There is no danger of the child moving the device backwardly by means of the operating handle or lever, and there are no dead centers so that as soon as the child either pushes or pulls on the lever the vehicle will start in a forward direction.

In order that the device may be adjusted to the strength of the child, an adjustable connection is made between the pitmen 25 and 26 and the arms 23 and 24. To this end, the arms formed with longitudinal slots to receive the bolts 28 by means of which the pitmen are connected to the arms. By securing the pitmen nearer the outer end of the arm less power is required to drive the device and the nearer the pitmen are secured to the axis the greater the power required.

Having described my invention what I claim as new and desire to secure by Letters Patent is:

In a device of the class described, a frame, a seat and an oscillating lever mounted in front of said seat, in combination with an axle rotatably mounted on said frame, drive wheels fixed to said axle, a pinion on said axle, a transverse rotary shaft, a gear fixed to said shaft, and meshing with said pinion, a ratchet fixed to each side of said gear, a casing upon each side of said gear and covering the respective ratchets, said casings being mounted to oscillate on said shaft, pawls carried by said casings and engaging said ratchets, a fixed radially extending arm on each of said casings and extending in opposite directions, pitmen pivotally connected to said lever and adjustable connection between said pitmen and said arms, substantially as described.

In testimony whereof I have signed my name to this specification in the presence of two subscribing witnesses.

JACOB J. WASKOM.

Witnesses:
J. R. LETCHER,
A. D. WINGATE.